(12) United States Patent
Tkach

(10) Patent No.: US 11,021,201 B2
(45) Date of Patent: Jun. 1, 2021

(54) KICK SCOOTER CONTROL MECHANISM

(71) Applicant: Jon Paul Tkach, Surry Hills (AU)

(72) Inventor: Jon Paul Tkach, Surry Hills (AU)

( * ) Notice: Subject to any disclaimer, the term of this patent is extended or adjusted under 35 U.S.C. 154(b) by 48 days.

(21) Appl. No.: 16/238,649

(22) Filed: Jan. 3, 2019

(65) Prior Publication Data

US 2019/0210676 A1 Jul. 11, 2019

(51) Int. Cl.
| | |
|---|---|
| *B62H 7/00* | (2006.01) |
| *B62K 3/00* | (2006.01) |
| *B62K 9/00* | (2006.01) |
| *B62K 9/02* | (2006.01) |
| *B62K 5/02* | (2013.01) |

(52) U.S. Cl.
CPC ............. *B62H 7/00* (2013.01); *B62K 3/002* (2013.01); *B62K 9/02* (2013.01); *B62K 5/02* (2013.01); *B62K 9/00* (2013.01)

(58) Field of Classification Search
CPC . B62H 7/00; B62K 3/002; B62K 9/00; B62K 9/02
See application file for complete search history.

(56) References Cited

U.S. PATENT DOCUMENTS

| | | | | |
|---|---|---|---|---|
| 2,645,505 A | * | 7/1953 | Durand | B62K 9/02 280/210 |
| 3,336,048 A | * | 8/1967 | Zdzislaw | F16B 2/08 74/551.8 |
| 3,656,777 A | * | 4/1972 | Keiser, Jr. | B62B 5/06 280/87.043 |
| 5,154,096 A | * | 10/1992 | Geller | B62H 7/00 280/273 |
| 5,395,130 A | | 3/1995 | Rubin | |
| 5,531,494 A | * | 7/1996 | Singleton | B62H 7/00 280/204 |
| 5,564,726 A | | 10/1996 | Hearn et al. | |
| 5,683,093 A | * | 11/1997 | Hayes | B62H 7/00 280/293 |
| 6,149,178 A | | 11/2000 | Bradbury et al. | |
| 6,398,248 B1 | | 6/2002 | Dodson | |

(Continued)

FOREIGN PATENT DOCUMENTS

| | | | | |
|---|---|---|---|---|
| FR | 2823709 A1 | * | 10/2002 | B62H 7/00 |
| FR | 2853617 A1 | * | 10/2004 | B62H 7/00 |

(Continued)

*Primary Examiner* — Christopher R Harmon

(57) ABSTRACT

A telescoping carer's handle for a child's kick scooter comprising a padded handle on one end of a telescoping pole mechanism. The telescoping pole mechanism is arranged parallel to and attaches to the vertical portion of the child kick scooter's T-bar handlebar by means of one or more clamps and brackets. The telescoping carer's handle is reversibly extendable and retractable from the scooter in a direction substantially upwards and downwards, respectively, relative to the handlebar portion of the scooter. There can be a locking mechanism between adjacent telescoping tubes that allows the user to raise or lower the top of the pole and then lock it into position so that, in use, a carer located adjacent to the scooter can grasp the handle at a comfortable height and safely steer, stop and or propel the scooter and child, and alternatively retract the carer's handle when not in use.

8 Claims, 8 Drawing Sheets

(56) References Cited

U.S. PATENT DOCUMENTS

| | | | |
|---|---|---|---|
| 6,918,606 B2 * | 7/2005 | Petrishe | B62H 7/00 |
| | | | 280/288.4 |
| 7,222,871 B2 * | 5/2007 | Michelau | B62H 7/00 |
| | | | 280/293 |
| 7,234,722 B1 | 6/2007 | Madigan et al. | |
| 8,801,024 B2 * | 8/2014 | Grainger | B62H 7/00 |
| | | | 280/293 |
| 9,193,371 B2 | 11/2015 | Sherman | |
| 2005/0057012 A1 * | 3/2005 | Boyle | B62K 3/16 |
| | | | 280/87.05 |
| 2015/0328079 A1 * | 11/2015 | Liles | A61G 7/1038 |
| | | | 280/47.34 |
| 2016/0318539 A1 * | 11/2016 | Joos | B62H 7/00 |

FOREIGN PATENT DOCUMENTS

| | | | | |
|---|---|---|---|---|
| GB | 2381782 A | | 5/2003 | |
| GB | 2412098 A | * | 9/2005 | B62K 21/12 |
| GB | 2444556 B | | 7/2011 | |
| GB | 2510122 | * | 7/2014 | |
| GB | 2537435 | * | 10/2016 | |
| WO | WO-2018032090 A1 | * | 2/2018 | B62H 7/00 |

\* cited by examiner

KICK SCOOTER CONTROL MECHANISM

CROSS-REFERENCE TO RELATED APPLICATIONS

The present invention claims priority from the Australian provisional patent application AU 2018900029 for a "Kick Scooter Control Mechanism" and filed on 5 Jan. 2018, the entirety of the contents of which are incorporated herein by reference.

TECHNICAL FIELD

The present invention relates to a mechanism for a kick scooter. In particular, the invention relates to a mechanism that can be used to control a child's kick scooter.

BACKGROUND

The following is a tabulation of some prior art that presently appears relevant:

| U.S. Patents | | | |
| --- | --- | --- | --- |
| Pat. No. | Kind Code | Issue Date | Patentee |
| 8,801,024 | B2 | Sep. 12, 2014 | Grainger |
| 9,193,371 | B2 | Nov. 24, 2015 | Sherman |

Kick scooters, especially the three-wheeled variety, have become popular with young children due to their stability and ease of use due in large part to the way they can be easily steered by leaning. A large proportion of children over 2 years old have a kick scooter. Even toddlers as young as 18-months old can get them moving, leading to increased independence and mobility for children just when they are beginning to grow frustrated by being confined to a stroller. In this way, kick scooters represent an alternative to bulky strollers for parents or other supervisors when they take children on outings.

The person supervising the child on the kick scooter can be referred to as a carer. Carers such as parents that have supervised a young child on a kick scooter will be familiar with the frustration of trying to keep the children and toddlers from going into the street, bumping into people and things, or just keeping up at a decent walking pace especially as the child regularly tires from the activity of propelling the kick scooter. Most carers confronted with these problems need to bend over quite severely in order to grab the handlebar of the kick scooter in order to control it. The handlebars are typically as short as only 70 cm tall. Only after stooping down in order to reach the short handlebar, can the carer then steer and or propel the child and the kick scooter forward. This type of supervision is difficult and especially taxing over long distances, severely limiting the utility of the scooter for smaller children.

One of the more popular kick scooter brands offers a seat attachment for their smallest model that allows a small child to ride in a sitting position. A pole extending at roughly a 45 degree angle off the back of the kick scooter allows an adult to push and or steer the kick scooter to a limited degree. This allows the child to ride while still being propelled and controlled, or at least guided, by the adult. However, children quickly outgrow the seat, dragging their legs, etc, or they become agitated and want to stand on the scooter like their older friends.

In order to stop from having to bend over while propelling their tired or meandering child and scooter, many carers have turned to tow devices made especially for three-wheeled kick scooters. These tow-rope and bar devices attach to the top of the handlebar and allow the carer to pull the child and scooter, much like a trailer attached to an automobile. However, the tow rope device can have drawbacks given that the rope is not rigidly attached to the scooter, which makes it difficult to control the speed, steer and or maneuver the scooter around obstacles. Similarly, the tow-bar does not give the carer very good control of the lean-to-steer function of the typical three-wheeled scooter, which is activated by leaning the vertical portion of the T-bar handle side to side, making it difficult for the carer to safely maneuver the scooter.

Also, for both the tow-rope and tow-bar devices, the relative positioning of child/carer is awkward as the child is up to a meter behind the carer, leaving little opportunity for them to interact with each other and enjoy the activity together. Furthermore, being behind the carer and therefore outside of the carer's natural field of vision, there is a concern that very young children such as toddlers will fall or dismount purposefully and wander into harm's way.

Accordingly, there exists a need for a mechanism that will provide a safe and comfortable way for a carer to propel, steer, maneuver and stop a small child on a kick scooter. It would be advantageous if the mechanism allowed for interaction between the carer and the child on the kick scooter and if the mechanism allowed the child to be in view of the carer during use.

SUMMARY OF THE EMBODIMENTS

In a first aspect of this invention, there is provided a telescoping carer's handle for a child's kick scooter comprising a padded handle on one end of a telescoping pole mechanism. The telescoping pole mechanism is arranged parallel to and attaches to the vertical portion of the child kick scooter's T-bar handle by means of one or more clamps and moulded plastic or metal brackets. The telescoping carer's handle is reversibly extendable and retractable from the scooter in a direction substantially upwards and downwards, respectively, relative to the handlebar portion of the scooter so that, in use, a carer located adjacent to the scooter can grasp the handle at a height greater than the kick scooter's handlebar and steer and or propel the scooter while the child rides the scooter.

By providing the carer/adult with an effective and comfortable means to propel and control the child's kick scooter, the scooter can effectively become an alternative to a bulky stroller for a child as young as 14-16 months regardless of ability to ride a scooter. Children this young are still unable to walk long distances, but resist spending long periods of time in the stroller, and furthermore both child and adult are likely to enjoy the kick scooter more than a stroller or other current mode of transporting a small toddler.

The telescoping carer's handle attachment may allow for the safe control of a kick scooter at jogging speeds (up to 7 mph). Many users and children may prefer taking the kick scooter for a run rather than a stroller that can be heavy and awkward to maneuver for the carer and boring for the toddler.

In an embodiment, the telescoping carer's handle is telescopic. The telescoping carer's handle can comprise at least two tubes. There can be more than two tubes such as three or four tubes telescoping into one another. In a preferred embodiment, however, there are two tubes; a first tube into which a smaller diameter second tube can be inserted. While tubes are referred to, it should be understood that at least one of the tubes (the inner slidable second tube) can be solid if desired. However, typically, the tubes are hollow so as to reduce the overall weight of the scooter.

There can be a locking mechanism between adjacent telescoping tubes that allows the user to raise or lower the top of the telescoping carer's handle so as to extend or retract it and then lock it into position. There can be more than one locking mechanism if there are more than two tubes, so as to lock each pair together.

One preferred embodiment may incorporate a locking mechanism. In one further embodiment, the locking mechanism may include a button and locking pin assembly attached to the outside of the larger diameter first tube. The pullable button that is accessible and visible on the outside of the first tube is attached to a locking pin that extends through the wall of the tube and through one of a number of apertures spaced along the smaller diameter second tube. When the outer button is fully pulled, the locking pin retracts from the aperture in the inner second tube, allowing it to move in or out, thereby lengthening or shortening the telescoping carer's handle. The spring-loaded pull button retracts when the locking pin encounters another aperture, securing the pole at the desired length.

There can be 1, 2, 3, 4, 5 or 6 apertures along the length of the smaller diameter second pole, although more can be added depending upon how many variations in height are desirable. The spacing can be equal or unequal between the apertures. The spacing can be at least about 5, 10 or 15 cm between each aperture depending on the desired range of height differences.

A number of other locking mechanisms for telescoping pole assemblies could also be utilized, such as, but not limited to, compression clamps (similar to a bicycle seat) or a twist and lock system where an assembly attached to the inserted end of the smaller diameter pole expands upon being twisted in one direction, therefore locking it in place, and the assembly contracts when twisted in the other direction, allowing the poles to slide and change the length of the telescoping carer's handle.

The telescoping carer's handle can attach to the vertical part of the handlebar portion of the kick scooter via one or more adjustable clamps and molded plastic or metal brackets. This allows the telescoping carer's handle to be retrofit to most existing scooters, including those with height adjustable handlebars that include a clamp on the front that impedes flush assembly of the telescoping carer's handle to the vertical portion of the handlebar. The telescoping carer's handle can be attached in front of the handlebars. The telescoping carer's handle can be attached behind the handlebars. In some embodiments, the scooter is purchased with the telescoping carer's handle already attached by welding or other means to the front of the scooter so that it is a permanent fixture.

In another embodiment, the smaller diameter second tube with padded end can be inserted into a hole in the top of a customized kick scooter "T" bar handlebar, allowing it to slide into the hollow vertical part of the handlebar portion, therefore using the vertical pole as the larger diameter pole, meaning that nothing would need to be attached to the outside of the kick scooter handlebar portion.

The telescoping carer's handle can be used in the fully "down" or retracted position so that the child can use the scooter as she would if the device were not attached at all. When the carer desires to be able to control the child and kick scooter, the carer releases the locking mechanism and lifts up on the padded handle end situated at the end of the smaller diameter second tube, lifting it from its housing within the larger diameter first tube until it locks at the desired length and allows the carer to control the scooter and child while still walking upright.

In a preferred embodiment, the larger diameter first tube measures at least about 35, 45, 50, 55 or 60 cm in length although shorter or longer lengths can be used. The inner tube can measure at least about 35, 45, 50, 53, 55 or 60 cm although longer or shorter tubes can be used. When fully extended the telescoping pole assembly can measure at least about 80, 90, 95, 100, 110 or 130 cm in length.

The tubes of the telescoping pole assembly can be constructed from aluminum or some other light, but rigid, synthetic or metal material.

BRIEF DESCRIPTION OF THE DRAWINGS

Embodiments of the invention will now be described with reference to the accompanying drawings, which are not drawn to scale and which are exemplary only, and in which.

DETAILED DESCRIPTION OF SPECIFIC EMBODIMENTS

Figure 1:
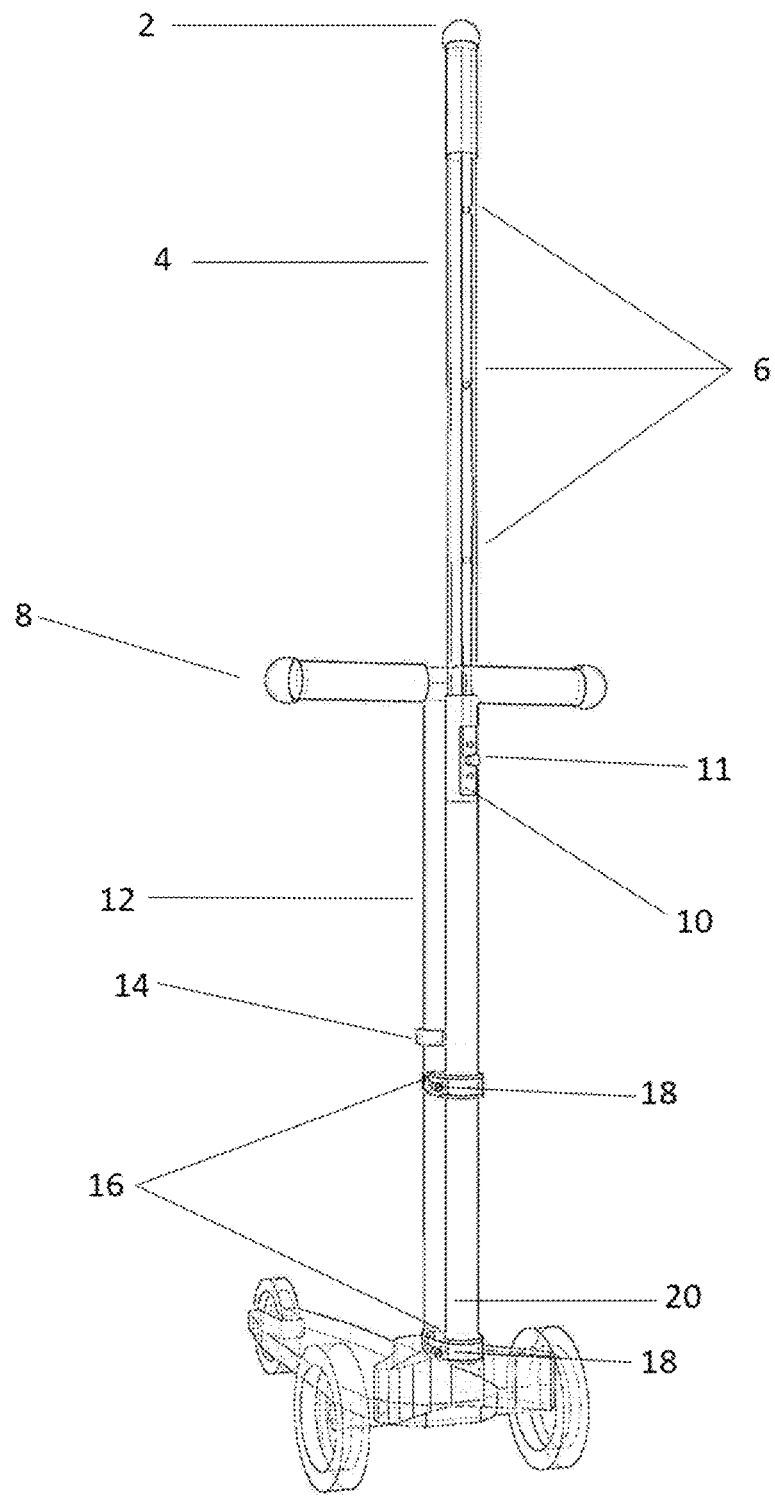
FIG. 1 is a perspective front view of a kick scooter equipped with an extended telescoping carer's handle.

FIG. 1 illustrates an embodiment comprising a telescoping carer's handle 4, 20 with two plastic molded brackets 16 and two worm drive type clamps 18 that attach the telescoping carer's handle to the vertical portion 12 of a scooter's T-bar handlebar portion. The telescoping carer's handle comprises a first tube 20 and a second tube 4, the second tube 4 being a smaller diameter than the first tube 20 and being nested within. The first and second tubes 20, 4 may slidably move relative to one another, enabling telescopic extension and retraction of the nested tubes.

In an embodiment, the second tube 4 may feature a padded end 2. The padding may be made from rubber or some other soft, durable material. The padding can help to ensure that the child will not be injured by it when used when fully retracted, and makes the handle more comfortable for the adult carer when used to propel the scooter and child.

In a further embodiment, the second tube 4 also comprises several apertures 6 spaced along the front side that interact with the locking mechanism 10. In order to fix the length of the telescoping handle, the smaller diameter second tube 4 can be slid into the larger diameter first tube 20 and the locking mechanism 10 can be engaged to lock the two poles 4, 20 relative to one another. The current embodiment features four apertures 6 on the front of the inner second pole spaced approximately 10 cm apart, giving the carer four different options as to the length of the telescoping carer's handle in order to accommodate the preferences of the carer according to size. Other embodiments can have more than or less than four apertures 6.

This arrangement provides several different heights for the telescoping carer's handle gripping end 2 depending on the preference (height, mobility) of the carer.

The handlebar portion of the scooter, as used herein, refers to the handlebars of the scooter 8, the vertical support bar 12 upon which the handlebars are mounted and the connection point therebetween.

Figure 2:
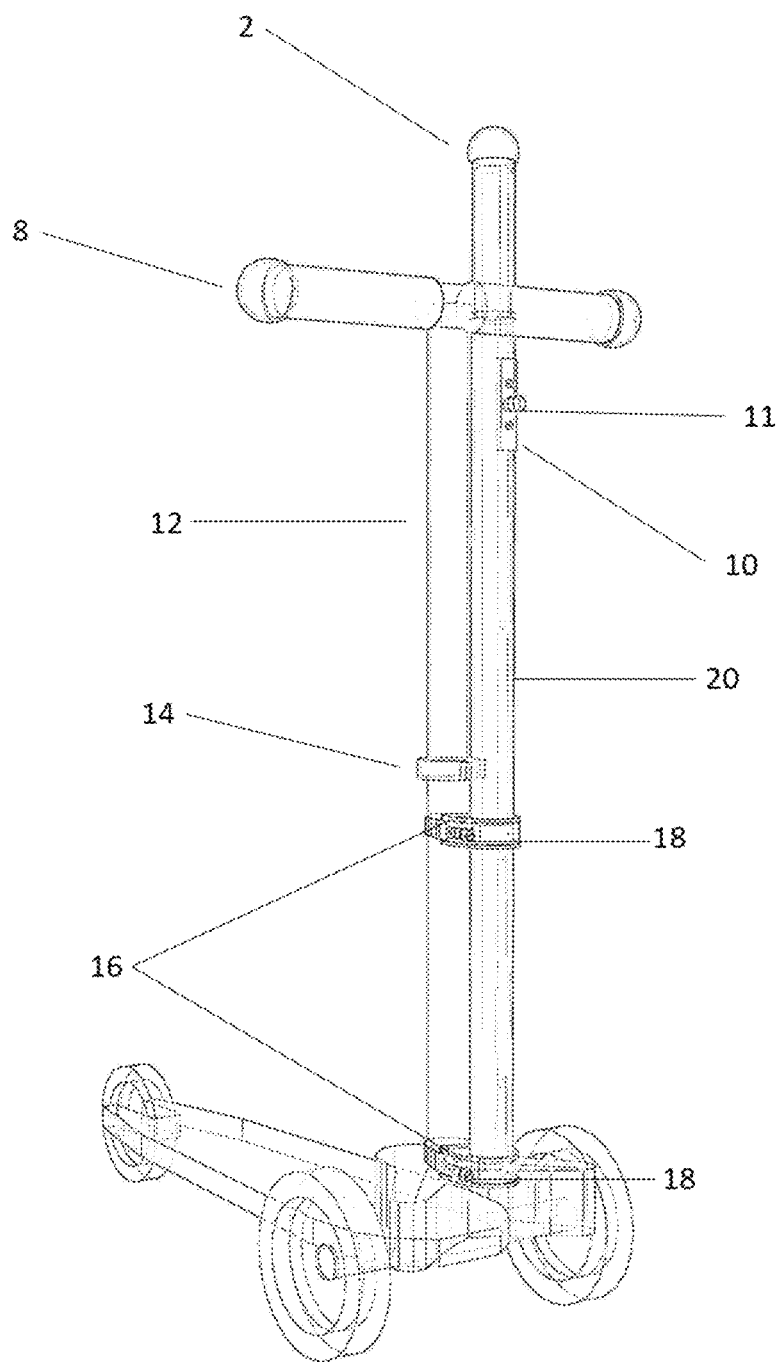
FIG. 2 is a perspective front view of a kick scooter equipped with a fully retracted telescoping carer's handle.
Figure 3:
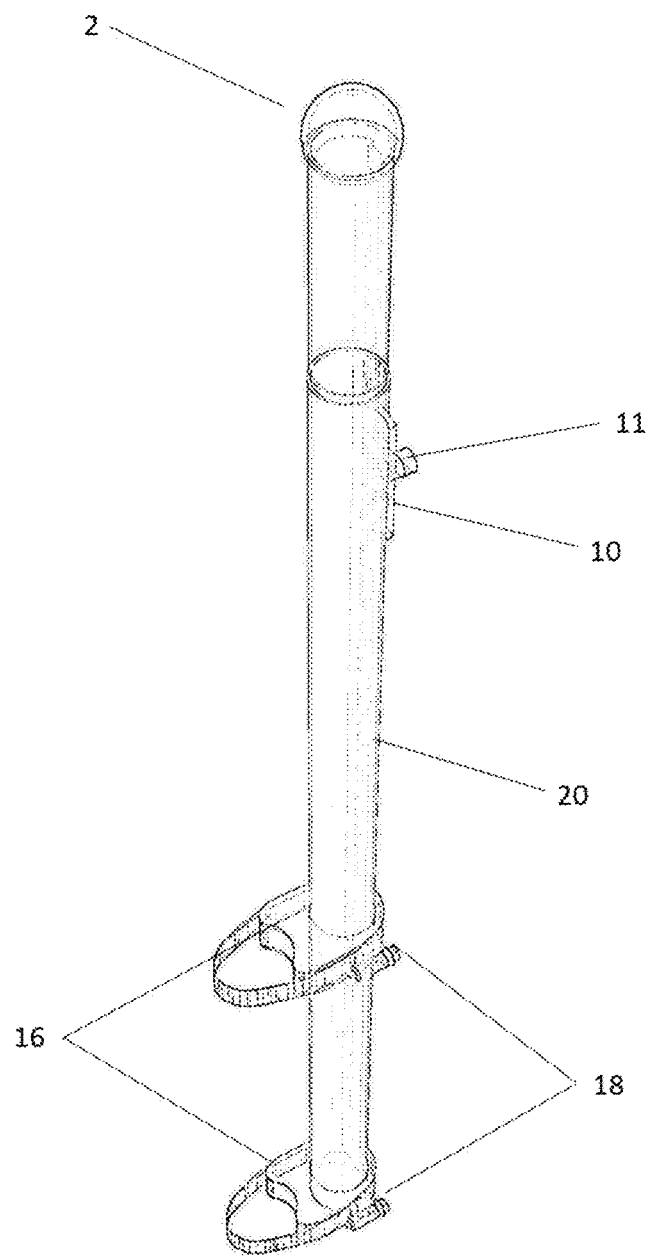
FIG. 3 is a perspective rear view of a fully retracted telescoping carer's handle.

The telescoping carer's handle can be fully retracted to the point where the top of the handle 2 is at a height similar to the horizontal part 8 of the kick scooter T-bar handlebar portion as shown in e.g. FIG. 2 and FIG. 3, allowing the child to ride the scooter unimpeded by the carer's handle and to make the scooter easier to store when not in use. The telescoping carer's handle can also be extended as shown in FIG. 1 and FIG. 5 to a number of different lengths in order to suit the preferences and physical requirements of the carer, providing the carer with a means with which to manipulate the scooter that sits at a height that is comfortable and safe.

Figure 4:
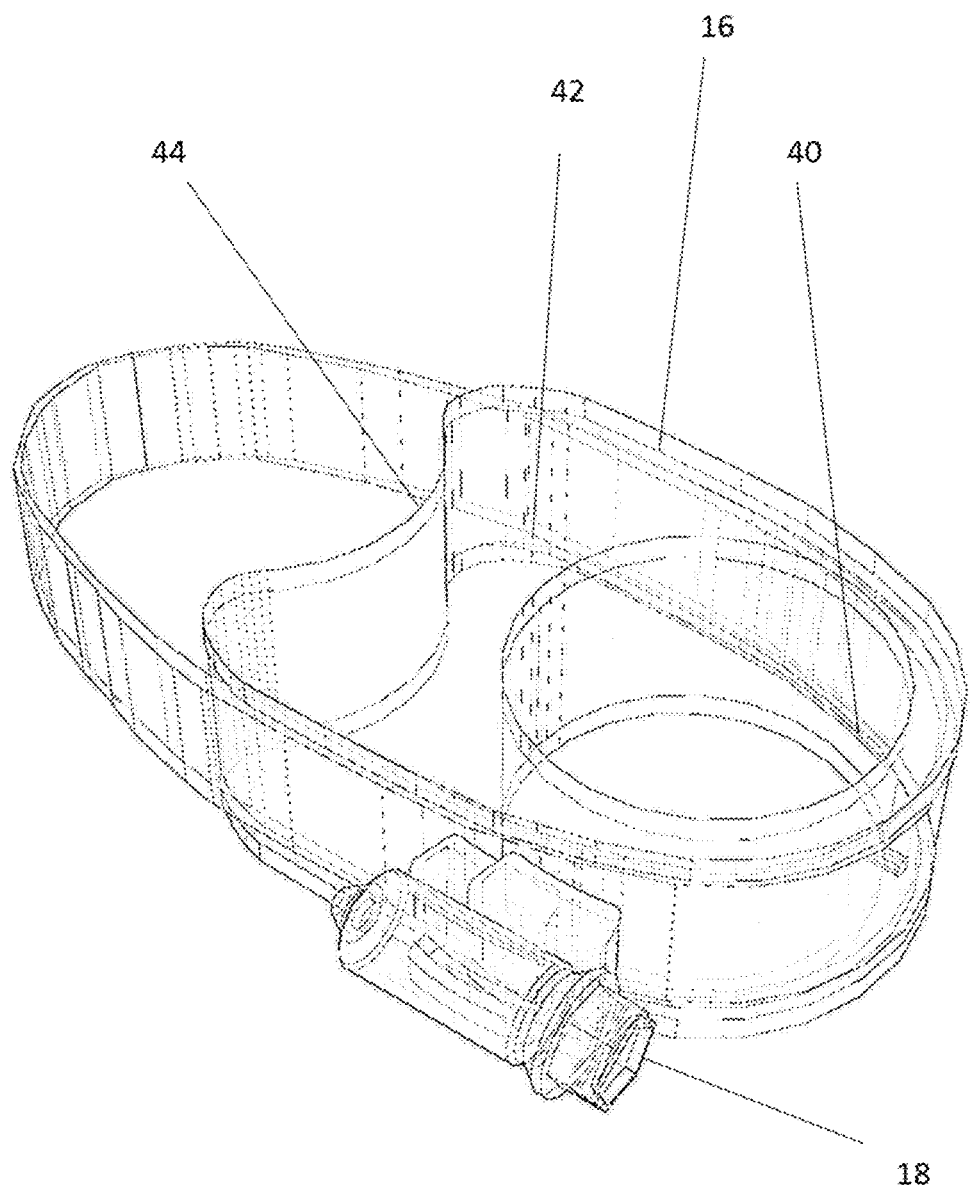
FIG. 4 is a perspective elevated view of a molded plastic or metal bracket and a clamp.

The telescoping carer's handle can attach to the vertical part 12 of the scooter T-bar handlebar portion via one or more adjustable worm-drive style clamps 18. FIG. 4 shows a closeup view of the bracket 16 and clamp 18 in the preferred embodiment, featuring two plastic molded or machined metal brackets 16 with a hole 40 the same diameter of the larger diameter first tube 20 on one end and a U-shaped depression 44 on the other end of the bracket 16. In this embodiment the larger diameter first tube 20 is inserted into the holes 44 in the brackets. Together with the worm drive style clamps 18, the brackets 16 are affixed to the larger diameter tube of the telescoping carer's handle via rivets. The brackets 16 may also be affixed to the larger diameter first tube 20 by other means such as but not limited to glue or welding. In order to attach the telescoping carer's handle, the U-shaped depressions 44 on the brackets 16 are pressed against the lower portion of the vertical part 12 of the scooter's T-bar handlebar portion, and the adjustable worm drive style clamps 18 are then tightened by the user with a wrench or screwdriver so that the clamps 18 encompass both the vertical part 12 of the scooter's T-bar handlebar portion and the larger diameter first tube 20 of the telescoping carer's handle.

In the preferred embodiment, the u-shaped depression 44 and the hole 40 on the bracket 16 are separated by bracket material 42 measuring approximately 1 cm. This arrangement allows the telescoping carer's handle to be retrofit to most existing scooters, including those with a height-adjustable vertical part 12 of the T-bar handlebar portion that include a clamp 14 that would impede a flush application of the device. A number of other means of attachment could be used, including but not limited to u-bolts, ladder strap and buckle assemblies or other means that affix the telescoping carer's handle to the handlebar portion by means of compression.

Figure 5:
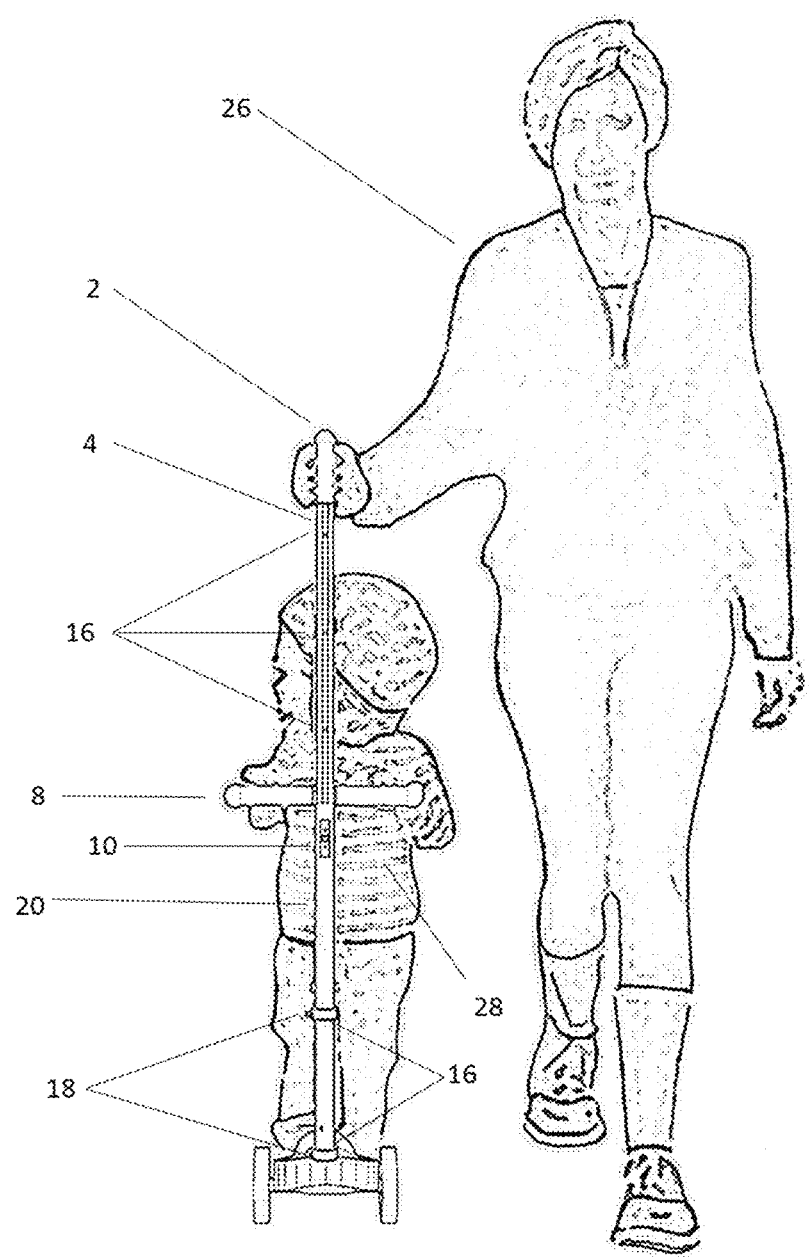
FIG. 5 is a front view of a carer walking alongside a child riding a kick scooter with the telescoping carer's handle attached.

FIG. 5 illustrates a front view of the telescoping carer's handle attached to a child's kick scooter. A carer 26 and child 28 are also shown. The carer 26 is shown grasping the padded handle 2 situated at the end of the smaller diameter second tube 4 of the telescoping carer's handle when it is in the fully extended position. This allows the carer's 26 hand to securely grasp the telescoping carer's handle 2 above the head of the child 28, making it easily accessible and at a height that is comfortable for the carer 26 yet allowing the carer 26 to easily and safely steer the kick scooter by leaning the telescoping handle to the left or to the right, and to propel the scooter forward or slow the scooter down and bring it to a stop.

In order to start using the scooter, the carer 26 can first arrange the top gripping portion 2 of the telescoping carer's handle to the desired height. This might differ depending on the weight of the child rider 28, the height of the carer 26 or just the preference of the carer 26 on that day. In order to raise the padded end 2 of the telescoping carer's handle, the carer 26 will move the padded handle 2, upwardly away from the horizontal part 8 of the handlebar portion until it reaches the desired height. The locking mechanism 10 can then be activated in order to secure the telescoping carer's handle in that desired configuration. In order to lower the padded end 2 of the telescoping carer's handle, the carer 26 can disengage the locking mechanism 10 and the inner second tube 4 can slide down within the outer first tube 20 lowering the padded end 2 to the desired height and be secured in place by activating the locking mechanism 10.

The preferred embodiment incorporates a locking mechanism 10 that includes a button 11, spring and locking pin assembly attached to the outside of the larger diameter first tube 20. The pullable button 11 that is accessible and visible on the outside of the large diameter first tube 20 is attached to a locking pin that extends through the wall of the tube 20 and through one of a number of apertures 6 spaced along the smaller diameter second tube 4. When the outer button 11 is fully pulled, the locking pin retracts from the aperture in the inner second tube 4, allowing the inner second tube 4 to move in or out, thereby lengthening or shortening the telescoping carer's handle assembly. The spring-loaded pull button 11 retracts when the locking pin encounters another aperture 6, securing the telescoping carer's handle at the desired length.

There may be 1, 2, 3, 4, 5 or 6 apertures along the length of the pole, although the skilled person may appreciate that more can be added depending upon how many variations in height are desirable without departing from the scope of the invention. In an embodiment, the spacing can be equal between the apertures. The spacing can be at least about 5, 10 or 15 cm between each aperture depending on the desired range of height differences.

Figure 7:
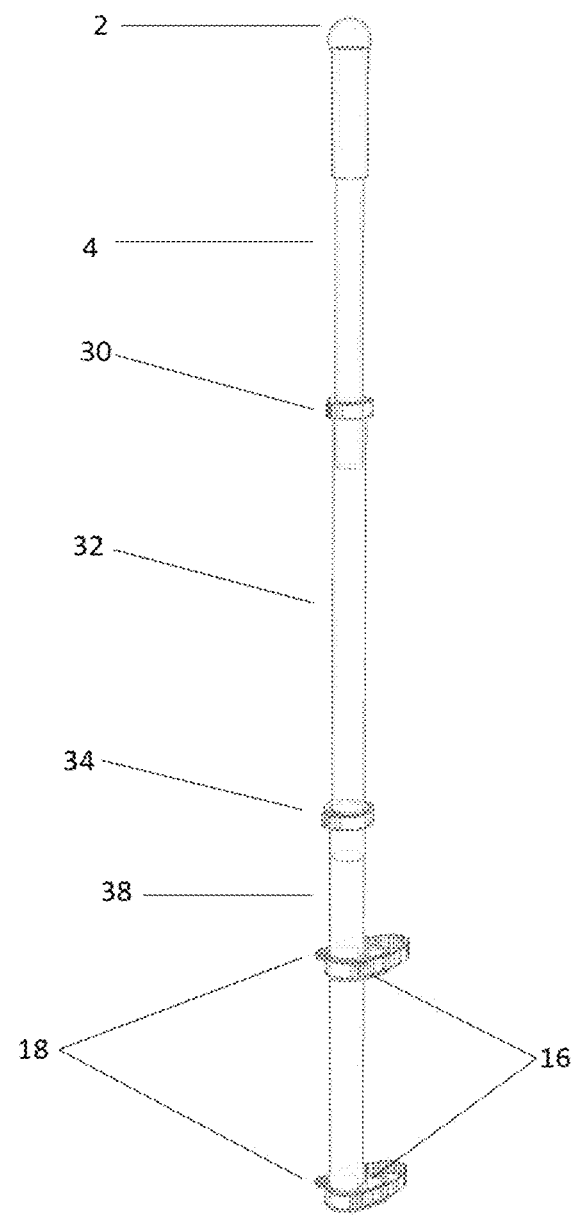
FIG. 7 is a perspective front view of a secondary embodiment of a fully extended telescoping carer's handle featuring three telescoping tubes.
Figure 8:
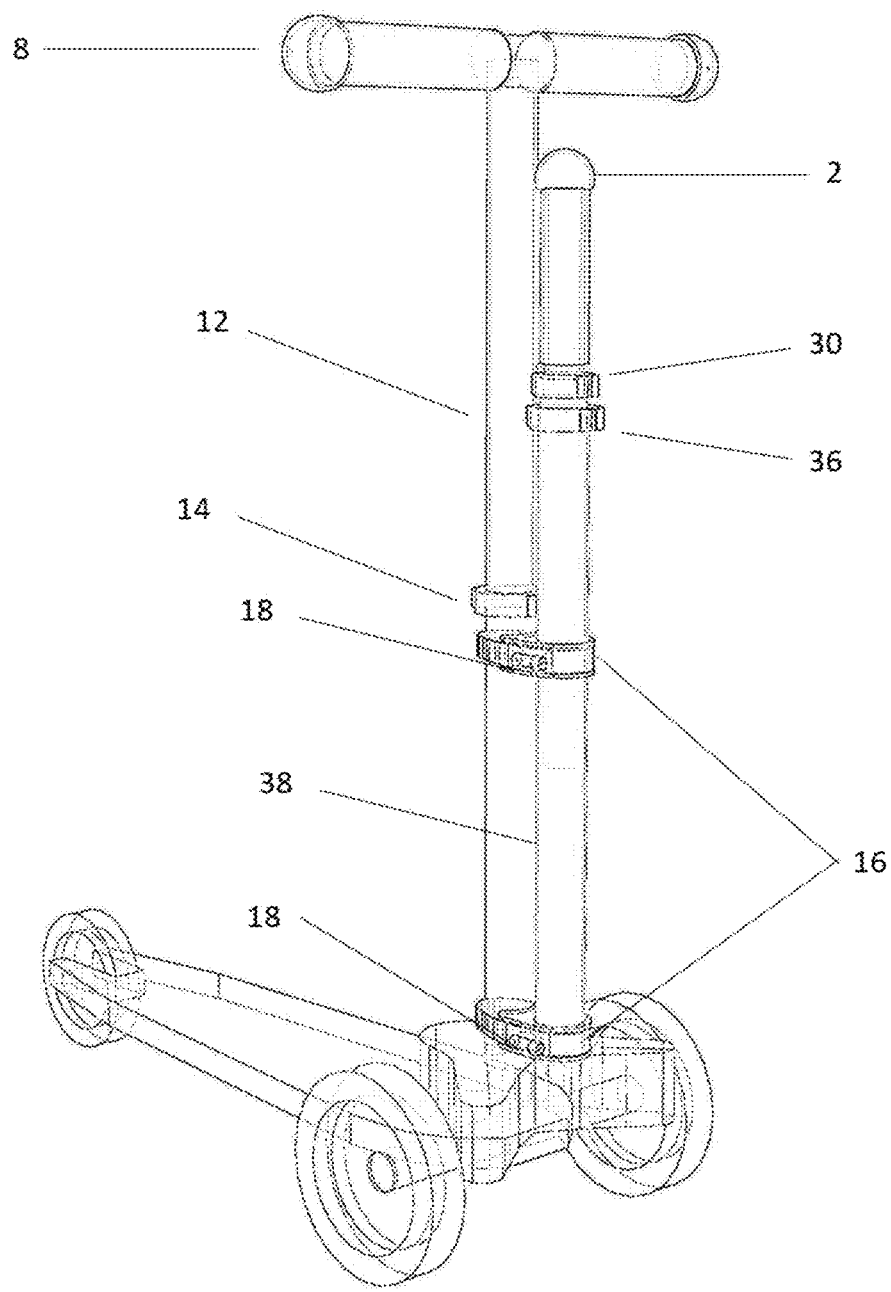
FIG. 8 is a perspective front view of a secondary embodiment of a fully retracted telescoping carer's handle featuring three telescoping tubes.

A number of other locking mechanisms for telescoping pole assemblies could also be utilized, such as, but not limited to, compression clamps 30, 34 similar to those used in a bicycle seatpost as shown in e.g. FIG. 7 and FIG. 8 or a twist and lock system where an assembly attached to the inserted end of the smaller diameter pole expands upon being twisted in one direction, therefore locking it in place, and the assembly contracts when twisted in the other direction, allowing the poles to slide and change lengths. These and other similar locking mechanisms that function by means of friction provide the user with a wide range of options when adjusting the height of the telescoping carer's handle.

Figure 6:
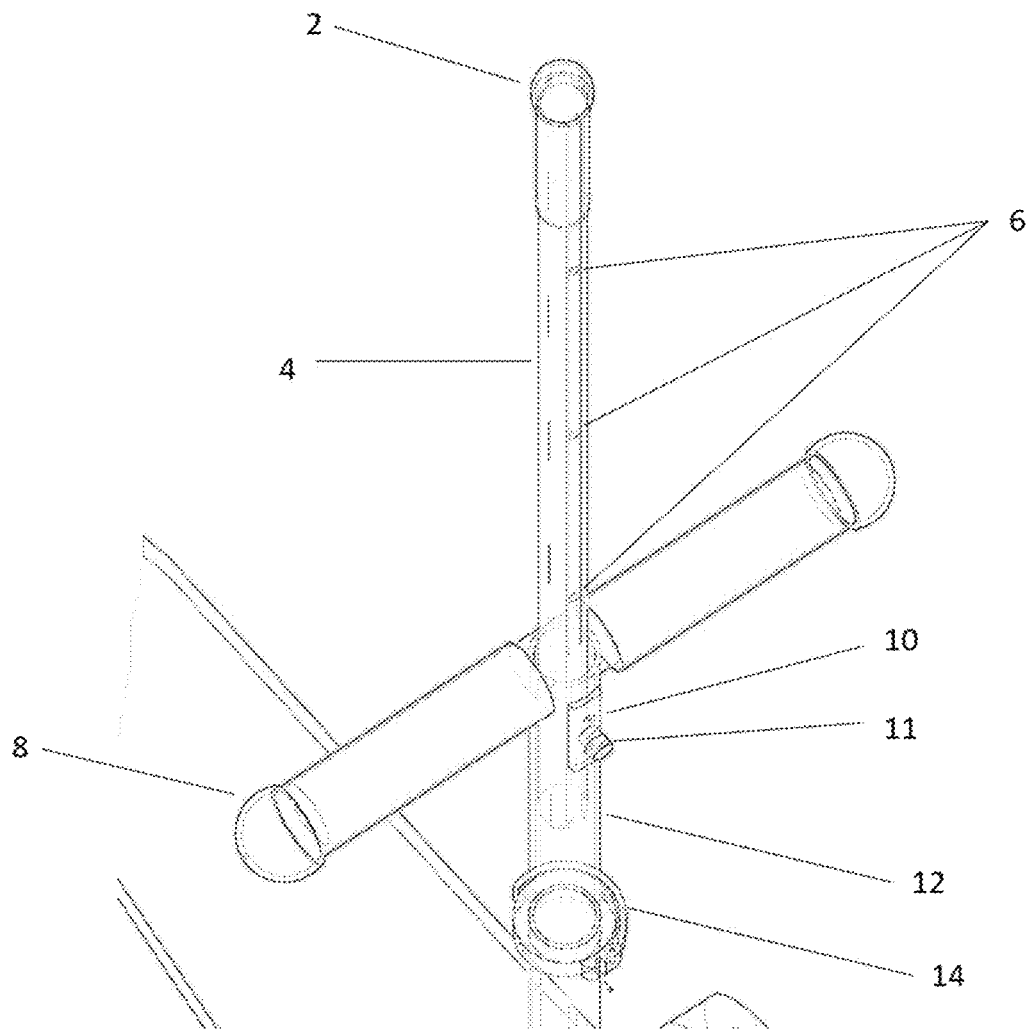
FIG. 6 is a perspective top view of the telescoping pole assembly integrated into the vertical pole of the CT' handlebar, where the smaller diameter top pole extends from the larger diameter vertical pole through an opening in the top of the "T" handlebar.

FIG. 6 illustrates an alternative embodiment. The smaller diameter top tube 4 is inserted into a hole in the top of the horizontal part 8 of a customized kick scooter "T" bar handlebar portion, allowing it to slide into the hollow vertical part 12 of the scooter's handlebar portion, therefore using said vertical part 12 as the larger diameter first tube, meaning that nothing would need to be attached to the outside of the kick scooter handlebar portion.

FIG. 7 and FIG. 8 illustrate another alternative embodiment. The telescoping carer's handle comprises three tubes 4, 32, 38 telescoping into one another. In this embodiment, two compression clamps 30, 34 similar to those used in bicycle seatposts are attached to the top ends of the two lower tubes 32, 38. There can be more than three tubes, such as four or five, and additional compression clamps may also be required. As shown in FIG. 8 the use of three tubes 4, 32, 38 allows the telescoping carer's handle to retract such that the padded handle grip 2 can rest at a position below the top part of the scooter's T-bar handlebar portion 8.

The skilled person will appreciate that the invention is not limited to the three-wheeled type of scooter shown in the figure, as any kick scooter with a vertical tube handle assembly can be equipped with the invention.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Any promises made in the present document should be understood to relate to some embodiments of the invention, and are not intended to be promises made about the invention in all embodiments. Where there are promises that are deemed to apply to all embodiments of the invention, the applicant/patentee reserves the right to later delete them from the description and they do not rely on these promises for the acceptance or subsequent grant of a patent in any country.

I claim:

1. A child's kick scooter, comprising:
   at least one front wheel;
   at least one back wheel;
   a generally horizontal support panel coupling the at least one front wheel to the at least one back wheel;
   a horizontal handlebar;
   a vertical member having a lower portion coupled to the support panel and an upper portion coupled to the horizontal handlebar;
   a first tube having an interior surface;
   a second tube sized to slidingly engage the interior surface of the first tube such that the second tube can extend vertically from and retract vertically into the first tube, the second tube having a padded upper portion;
   a locking mechanism for, in a first position, allowing the second tube to slidingly move vertically within the first tube, and in a second position, preventing the second tube from slidingly vertical movement or rotationally moving within the first tube; and
   at least one removable attachment means for attaching the first tube to the vertical member such that the first tube once attached is generally parallel to the vertical member.

2. The child's kick scooter of claim 1, wherein a single aperture is defined on one side portion of the first tube.

3. The child's kick scooter of claim 2, wherein the second tube has a plurality of apertures longitudinally aligned on one side portion of the second tube.

4. The child's kick scooter of claim 3, wherein the locking mechanism is a locking pin configured such that in a locking position, a portion of the locking pin protrudes through the single aperture of the first tube and through one of the plurality of apertures of the second tube and in a unlocked position, a portion of the locking pin does not protrude through one of the plurality of apertures of the second tube.

5. The child's kick scooter of claim 4, further comprising a biasing member coupled to the locking pin and positioned to bias the locking pin into the locking position.

6. The child's kick scooter of claim 1, wherein the locking mechanism is a compression clamp partially positioned within the first tube and slidingly coupled to the second tube such that when the compression clamp is in a first twisted position the second tube can slide within the compression clamp and the first tube; and when the compression clamp is in a second twisted position, the compression clamp frictionally engages the second tube to prevent the second tube from sliding within the compression clamp and the first tube.

7. The child's kick scooter of claim 1, wherein the at least one removable attachment means comprises:
   a first plastic molded bracket having one face defining a U-shaped depression sized to engage the vertical member of the scooter and having an aperture sized to allow the first tube to slide through, and
   a first worm drive style clamp having a strap sized to surround the first plastic molded bracket and the vertical member of the scooter.

8. The child's kick scooter of claim 7, wherein the at least one removable attachment means also comprises:
   a second plastic molded bracket having a second face defining a second U-shaped depression sized to engage the vertical member of the scooter and having a second aperture sized to allow the first tube to slide through, and
   a second worm drive style clamp having a second strap sized to surround the second plastic molded bracket and the vertical member of the scooter.

* * * * *